United States Patent
Xue et al.

(10) Patent No.: US 9,580,255 B2
(45) Date of Patent: Feb. 28, 2017

(54) WIRE BUFFER DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Fengming Xue, Beijing (CN); Chongxi Wei, Beijing (CN); Guanjun Li, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 221 days.

(21) Appl. No.: 14/518,220

(22) Filed: Oct. 20, 2014

(65) Prior Publication Data

US 2015/0320205 A1 Nov. 12, 2015

(30) Foreign Application Priority Data

May 6, 2014 (CN) .................. 2014 2 0228569 U

(51) Int. Cl.
*A47G 19/08* (2006.01)
*B65G 49/06* (2006.01)
*A47B 55/02* (2006.01)

(52) U.S. Cl.
CPC .......... *B65G 49/062* (2013.01); *A47B 55/02* (2013.01)

(58) Field of Classification Search
CPC ...... B65G 49/062; B65G 49/68; B65G 49/67; A47B 55/02
See application file for complete search history.

(56) References Cited

U.S. PATENT DOCUMENTS

| | | | | | |
|---|---|---|---|---|---|
| 4,320,826 | A | * | 3/1982 | Kramer | B65G 49/062 198/430 |
| 4,401,406 | A | * | 8/1983 | Rovira | A61N 5/00 212/201 |
| 6,176,018 | B1 | * | 1/2001 | Wiklund | G01B 5/0002 33/1 M |
| 7,217,077 | B2 | * | 5/2007 | Mercure | B65G 49/062 209/542 |
| 7,771,538 | B2 | * | 8/2010 | Hwang | C23C 16/4585 118/728 |
| 7,878,754 | B2 | * | 2/2011 | Mercure | B65G 49/062 414/801 |
| 7,942,623 | B2 | * | 5/2011 | Hwang | C23C 16/4585 216/67 |

(Continued)

*Primary Examiner* — Leslie A Nicholson, III
*Assistant Examiner* — Kimberley S Wright
(74) *Attorney, Agent, or Firm* — BakerHostetler LLP

(57) ABSTRACT

The present disclosure provides a wire buffer device. The wire buffer device comprises: a frame; and multiple of support layers provided to the frame and arranged in layers. Each of the support layers includes multiple sections of wires that support a substrate. The multiple sections of wires are in the form of at least one integrated wire. The wire buffer device further includes at least one transmission structure. Said at least one transmission structure drives each of said at least one integrated wire to perform a reciprocating motion so that at least a part of each of said at least one integrated wire moves into or moves out from the frame. For the wire buffer device, work operability is improved, and secondary contamination to the device is avoided.

20 Claims, 3 Drawing Sheets

(56) References Cited

U.S. PATENT DOCUMENTS

| | | | | |
|---|---|---|---|---|
| 9,004,839 B2* | 4/2015 | Wang | ............... | B65G 49/061 198/409 |
| 2004/0228708 A1* | 11/2004 | Mercure | ........... | B65G 49/062 414/266 |
| 2005/0126882 A1* | 6/2005 | Lisec | ................ | B24B 9/10 198/345.1 |
| 2005/0155557 A1* | 7/2005 | Hwang | ............ | C23C 16/4585 118/728 |
| 2006/0182556 A1* | 8/2006 | Liu | .................. | B65D 85/48 414/331.01 |
| 2007/0020067 A1* | 1/2007 | Lin | .................. | B65G 1/023 414/331.09 |
| 2007/0190898 A1* | 8/2007 | Mercure | ........... | B65G 49/062 451/6 |
| 2008/0249651 A1* | 10/2008 | Hosek | .............. | B25J 9/042 700/121 |
| 2010/0034622 A1* | 2/2010 | Kishimoto | ....... | H01L 21/67784 414/222.01 |
| 2010/0126830 A1* | 5/2010 | Kudva | .............. | B65G 49/061 198/493 |
| 2010/0260589 A1* | 10/2010 | Hwang | ............ | C23C 16/4585 414/806 |
| 2013/0094925 A1* | 4/2013 | Wang | ............... | B65G 49/061 414/277 |
| 2013/0256248 A1* | 10/2013 | Li | .................. | B65G 49/061 211/41.14 |
| 2014/0083818 A1* | 3/2014 | Hirasawa | .......... | B65G 49/061 198/468.2 |
| 2014/0321951 A1* | 10/2014 | Wang | ................ | B63B 27/30 414/137.9 |
| 2015/0104275 A1* | 4/2015 | Beck | ................ | B66C 13/02 414/141.7 |
| 2015/0206782 A1* | 7/2015 | Caveney | ........... | B25J 11/0095 414/744.6 |

\* cited by examiner

WIRE BUFFER DEVICE

CROSS-REFERENCE TO RELATED APPLICATION

This application claims priority to Chinese Utility Model Application No. 201420228569.9 filed on May 6, 2014, the disclosure of which is entirety incorporated herein by reference.

TECHNICAL YIELD

The present disclosure relates to the field of manufacturing a display device, in particular to a wire buffer device.

BACKGROUND

In conventional production line of TFT-LCD (Thin Film Transistor-Liquid Crystal display), a wire buffer device is normally used for storing and transferring a glass substrate. FIG. 1 shows a configuration of a wire buffer device that is normally used in the conventional production line of the TFT-LCD. As shown in FIG. 1, the conventionally-used wire buffer device includes a frame 20 and multiple support layers provided in the frame 20 for supporting multiple substrates 10. Each support layer includes multiple plastic coated steel wires 30, and each plastic coated steel wire 30 is fixed to the frame (For example, both ends of each plastic steel wire may be fixed to the frame via screws). The glass substrate may be placed on the plastic coated steel wires of each layer. The frame 20 ascends or descends together with the plastic steel wires in order to store or release the glass substrate.

The conventionally-used wire buffer device has the following problems. The plastic coated steel wires configuring each layer of the wire buffer device may be covered by great amount of dust when cleaning is not carried out to the plastic steel wires for a long period of time. Thus, the glass substrate in the production line may be contaminated by the dust. In the conventionally-used wire buffer device, since a space between adjacent two layers of plastic steel wires is narrow, it is difficult for an operator to perform maintenance work to an inside portion of the plastic steel wires of each layer. Even if the operator enters the inside portion, fiber contamination on the operator may cause a secondary contamination to the device. In order to clear the secondary contamination, a non-production purpose substrate needs to be transferred in the production line in order to clear the fibers. Usually, the buffer has relatively great number of layers. Thus, the number of non-production purpose substrates need to be transferred in the production line is not less than 120. This may cause a reduction in production efficiency, an increase in production cost, an increase in work load, and unsatisfactory effect of cleaning and maintenance.

SUMMARY

An object of the present disclosure is to provide a wire buffer device which has a simple structure and is capable of reducing time required for cleaning and maintenance and provides an improved effect of cleaning and maintenance.

The following will describe a technical summary of the present disclosure.

According to an embodiment of the present disclosure, a wire buffer device comprises: a frame; and multiple of support layers provided to the frame and arranged in layers. Each of the support layers includes multiple sections of wires that support a substrate. The multiple sections of wires are in the form of at least one integrated wire. The wire buffer device further includes at least one transmission structure. Said at least one transmission structure drives each of said at least one integrated wire to perform a reciprocating motion so that at least a part of each of said at least one integrated wire moves into or moves out from the frame.

In the wire buffer device according to the above-described embodiment, the transmission structure drives the multiple sections of wires included in each of said at least one integrated wire to move into or move out from the frame.

In the wire buffer device according to the above-described embodiment, the transmission structure drives the multiple sections of wires included in each of said at least one integrated wire to entirely move into or move out from the frame.

In the wire buffer device according to the above-described embodiment, the transmission structure includes: a first pulley set and a second pulley set fixed to two opposed sides of the frame, respectively. The first pulley set includes a multiple of first pulleys arranged in an approximate rectangular array and the second pulley set includes a multiple of second pulleys arranged in an approximate rectangular array. And the transmission structure further includes a driving subassembly that drives the integrated wire to be transmitted in the transmission structure. The integrated wire is alternately wounds to the first pulleys and the second pulleys to form the support layers.

In the wire buffer device according to the above-described embodiment, the driving subassembly includes: a first driving wheel that drives the integrated wire to rotate over the first pulleys and the second pulleys in a first direction. One end of the integrated wire is fixed to the first driving wheel. And the driving subassembly further includes a second driving wheel that drives the integrated wire to rotate over the first pulleys and the second pulleys in a second direction opposite to the first direction. The other end of the integrated wire being fixed to the second driving wheel.

In the wire buffer device according to the above-described embodiment, at least one of the first driving wheel and the second driving wheel includes a lock device that controls a movement of the integrated wire. In the wire buffer device according to the above-described embodiment, in at least two of the support layers, the multiple sections of wires are in the form of an integrated wire, and the multiple sections of wires included in each support layer are arranged in parallel between the first pulley set and the second pulley set. In the wire buffer device according to the above-described embodiment, a part of the first pulleys are arranged as multiple columns of first parallel pulleys. Rotating axes of the first parallel pulleys are in a first direction that is parallel to a direction in which the substrate is placed. A part of the first pulleys are arranged as first vertical pulleys. Rotating axes of the first vertical pulleys are in a second direction that is perpendicular to the direction in which the substrate is placed. And the second pulleys are arranged as multiple columns. Rotating axes of the second pulleys are in the first direction that is parallel to the direction in which the substrate is placed. The integrated wire are wound back and forth on the first parallel pulleys and the second pulleys that are included in a same column and are arranged in the first direction so that the integrated wire forms the multiple sections of wires arranged at predetermined intervals in vertical direction in different support layers. And the first vertical pulleys are arranged outside of two ends of each column of the first parallel pulleys and are used to lead the integrated wire from the first parallel pulley included in one column to the first parallel pulley included in an adjacent column.

In the wire buffer device according to the above-described embodiment, a position at which the integrated wire is leaded out from a first parallel pulley is aligned with and placed on a same horizontal level with a position at which the integrated wire is leaded into a next second pulley; or a position at which the integrated wire is leaded out from a second pulley is aligned with and placed on a same horizontal level with a position at which the integrated wire is leaded into a next first parallel pulley.

In the wire buffer device according to the above-described embodiment, at a position outside of two adjacent columns of first parallel pulleys, a pair of first vertical pulleys parallel to one another is arranged in order to guide the integrated wire from one first parallel pulley included on one column to the first parallel pulley included on an adjacent column.

In the wire buffer device according to the above-described embodiment, a part of the first pulleys are arranged as second parallel pulleys. Rotating axes of the second parallel pulleys are in a first direction that is parallel to a direction in which the substrate is placed. A part of the first pulleys are arranged as multiple lines of second vertical pulleys. Rotating axes of the second vertical pulleys are in a second direction that is perpendicular to the direction in which the substrate is placed. And the second pulleys are arranged as multiple lines. Rotating axes of the second pulleys are in the second direction that is perpendicular to the direction in which the substrate is placed. The integrated wire are wound back and forth on the second vertical pulleys and the second pulleys that are included in a same line and are arranged in the second direction so that the integrated wire forms the multiple sections of wires arranged at predetermined intervals in horizontal direction in each of the support layers. And the second parallel pulleys are arranged outside of two ends of each line of the second vertical pulleys and are used to lead the integrated wire from the second vertical pulley included in one line to the second vertical pulley included in an adjacent line.

In the wire buffer device according to the above-described embodiment, the integrated wire forms each horizontal support layer by being wound back and forth to the second vertical pulleys and the second pulleys that are arranged in a same line and on a same horizontal level in the second direction.

In the wire buffer device according to the above-described embodiment, at a position outside of two adjacent lines of second vertical pulleys, a pair of first parallel pulleys parallel to one another is arranged in order to guide the integrated wire from one second vertical pulley included in one line to the second vertical pulley included in an adjacent line.

In the wire buffer device according to the above-described embodiment, the driving subassembly further includes: a first guide wheel disposed between the first driving wheel and one of the pulleys which guides the integrated wire firstly into the frame; and a second guide wheel disposed between the second driving wheel and one of the pulleys which guides the integrated wire lastly from the frame.

In the wire buffer device according to the above-described embodiment, a distance between two of the support layers adjacent to each other may be equal to 4.5 cm, and a distance between two adjacent wires in each of the support layers may be equal to 20 cm.

In the wire buffer device according to the above-described embodiment, the wires are provided by plastic coated steel wires.

In the wire buffer device according to the above-described embodiment, in each of the first pulleys and the second pulleys, an internal diameter may be equal to 2 cm, an external diameter may be equal to 2.7 cm, and a width of an internal groove may be equal to 3.5 mm. And in each of the first driving wheel and the second driving wheel, an internal diameter may be equal to 3 cm, an external diameter may be equal to 50 cm, and a width of an internal groove may be equal to 20 mm.

In the wire buffer device according to the above-described embodiment, a length of each of the at least one integrated wire is equal to or greater than twice the sum length of the wires that are conventionally being used as support layers by being wound to the pulleys.

The present disclosure provides the following advantages.

In the wire buffer device according to the present disclosure, the multiple sections of the wires included in the support layers are connected in series via the transmission structure, and are formed as an integrated wire or into multiple integrated wires. Each integrated wire is capable of performing the reciprocating motion via the transmission structure so that each integrated wire moves into or moves out from frame. When the cleaning and maintenance needs to be carried out, the transmission structure moves the integrated wire to outside of the frame. During moving out the integrated wire or after moving out the integrated wire, the cleaning and maintenance can be carried out to the integrated wire. Thus, the cleaning and maintenance can be carried out to the wires outside of the frame. This configuration solves the difficulty in cleaning and maintenance which exists in the conventionally-used wire buffer device. When the cleaning and maintenance is finished, the transmission structure moves the integrated wire into the frame to reset the wires.

Thus, work operability is improved, secondary contamination to the device is avoided, time required for the maintenance is reduced, and size of the cleaning space, wipers required for the cleaning and maintenance is reduced thereby reducing production cost, and cleaning and maintenance effect is improved.

DETAILED DESCRIPTION

Figure 1:
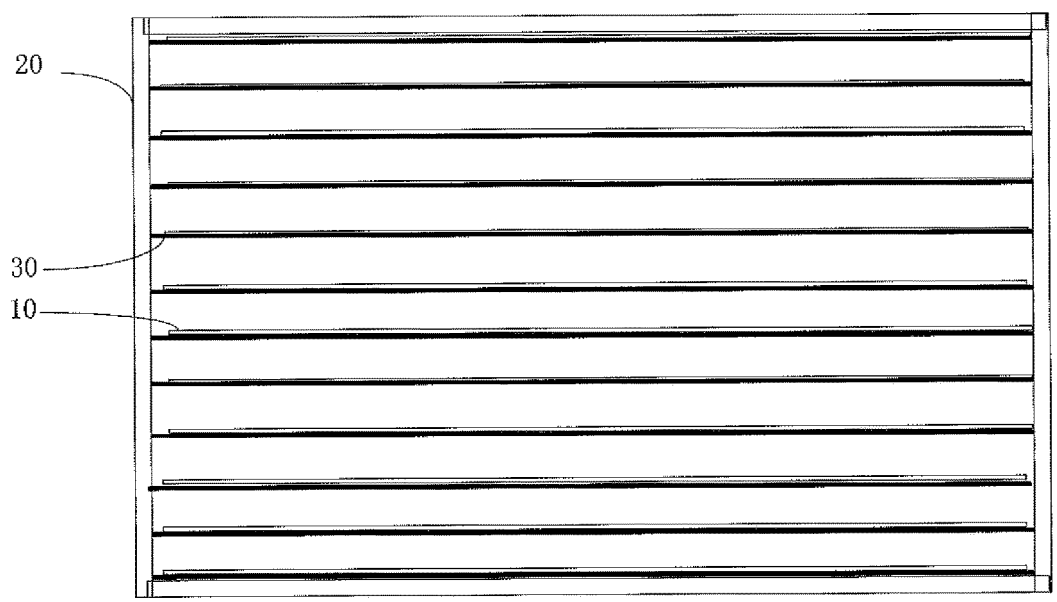
FIG. 1 is a front view showing a conventional configuration of a wire buffer device when the wire buffer device stores substrates.
Figure 2:
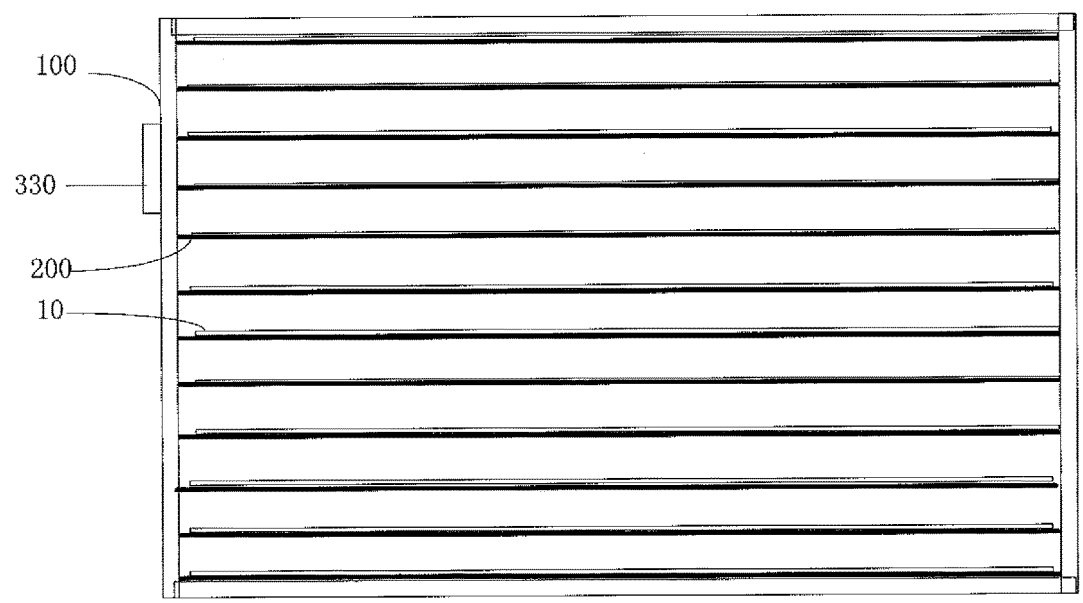
FIG. 2 is a front view showing a configuration of a wire buffer device according to an embodiment of the present disclosure when the wire buffer device stores substrates.

To make the objects, the technical solutions and the advantages of the present disclosure more apparent, the following will describe embodiments of the present disclosure with reference to accompanying drawings. The embodiments described below are only for explaining the present disclosure, but not intended to limit a scope of the disclosure.

According to the conventional configuration, the wire buffer device that buffers the substrates has the following problems. For example, cleaning and maintenance is hard to be carried out and cleaning effect is unsatisfactory. An embodiment of the present disclosure provides a wire buffer device to which cleaning and maintenance can be carried out easily and conveniently, and the wire buffer device also provides an improved effect of cleaning.

As shown in FIG. 2 to FIG. 5, the wire buffer device according to an embodiment of the present disclosure includes a frame 100 and one or more support layers provided to the frame 100 in a layered manner.

Each support layer includes multiple sections of the wires 200 that support a substrate 10, and a transmission structure. The multiple sections of the wires 200 included in the support layers are in the form of at least one integrated wire. The transmission structure drives the integrated wire to perform a reciprocating motion so that at least a part of the integrated wire moves into or moves out from the frame 100. The transmission structure is provided on the frame 100, and the integrated wire is arranged to the transmission structure in a transmissible manner.

In the wire buffer device according to the present embodiment, the multiple sections of the wires 200 included in the support layers are formed as an integrated wire or multiple integrated wires. Each integrated wire is capable of performing the reciprocating motion via the transmission structure so that each integrated wire moves into or moves out from frame 100. When the cleaning and maintenance needs to be carried out, the transmission structure moves the integrated wire or a part of the integrated wire to outside of the frame 100. During moving or after moving out the integrated wire or a part of the integrated wire, the cleaning and maintenance can be carried out to the integrated wire or a part of the integrated wire. Thus, the cleaning and maintenance can be carried out to the wires outside of the frame. This configuration solves the difficulty in cleaning and maintenance which exists in the conventionally-used wire buffer device. When the cleaning and maintenance is finished, the transmission structure moves the integrated wire or a part of the integrated wire into the frame 100 to reset the wires.

As described above, in the wire buffer device provided in the present disclosure, the cleaning and maintenance work of the wires is performed outside of the frame. This configuration improves a convenience of the work, avoids causing a secondary contamination to the wire buffer device, reduces time required for the cleaning and maintenance, reduces an amount of cleaning wipers, lowers a production cost, and provides an improved effect of cleaning and maintenance.

The following will describe a preferred embodiment of the wire buffer device provided by the present disclosure.

As shown in FIG. 2 to FIG. 6, in the present embodiment, the transmission structure preferably includes a first pulley set 310 and a second pulley set 320 respectively fixed to two opposed ends of the frame 100, and two driving assemblies 330, 340. The first pulley set 310 includes multiple pulleys arranged approximately in a rectangular array. The multiple pulleys are aligned both in vertical direction and in horizontal direction, and arranged in multiples columns when viewed from the vertical direction. Specifically, the first pulley set 310 includes multiple first pulleys 311 arranged from one another by a predetermined interval in the vertical direction in each column. The second pulley set 320 includes multiple pulleys arranged approximately in a rectangular array. The multiple pulleys are aligned both in vertical direction and in horizontal direction, and arranged in multiples columns when viewed from the vertical direction. Specifically, the second pulley set 320 includes multiple second pulleys 321 arranged from one another by a predetermined interval in the vertical direction in each column. The integrated wire alternatively runs over multiple first pulleys 311 and multiple second pulleys 321 in order to form the support layers.

The driving subassembly drives the integrated wire to run back and forth over the first pulleys 311 and the second pulleys 321, and is connected with at least one end of the integrated wire.

In the present disclosure, terms of "multiple pulleys arranged approximately in a rectangular array" mean that most pulleys (e.g. pulleys 311a in FIG. 5) are arranged in a rectangular array, but only a part of pulleys (e.g. pulleys 311b in FIG. 5) are not arranged in the rectangular array for their functions. Term of "column" means pulleys arranged in vertical column. Term of "line" means pulleys arranged in horizontal line (or row).

In above-described configuration, two pulley sets are disposed at two opposed ends of the frame 100, respectively, and the integrated wire is alternatively wound to the pulleys in order to configure the support layers having multiple sections of the wires 200. Since the integrated wire is arranged on the first pulleys 311 and the second pulleys 321 in a transmissible manner, the integrated wire is able to move back and forth on the first pulleys 311 and the second pulleys 321 when driven by the driving subassembly. With this configuration, at least one part of the integrated wire is able to move into or out from the frame 100.

As shown in FIG. 3 to FIG. 6, in the present embodiment, the driving subassembly may alternatively include a first driving wheel 330 and a second driving wheel 340.

The first driving wheel 330 drives the integrated wire to rotate over the first pulleys 311 and the second pulleys 321 in a first direction. A part of the integrated wire which is able to move into or out from the frame 100 is wound to the first driving wheel 330.

The second driving wheel 340 drives the integrated wire to rotate over the first pulleys 311 and the second pulleys 321 in a second direction opposite to the first direction. The other part of the integrated wire is alternatively wound to the first pulleys 311 and the second pulleys 321, and is able to be wound to the second driving wheel 340.

In the above-described configuration, one end of the integrated wire is fixed on the first driving wheel 330. When the cleaning and maintenance needs to be carried out to the wire buffer device, the first driving wheel 330 can be rotated. When the first driving wheel 330 is rotated, the first driving wheel 330 drives the integrated wire to rotate over the first pulleys 311 and the second pulley 321 in the first direction. The first driving wheel 330 may be disposed on one side of the frame 100 so that the wire, which is moved out from the frame 100 by rotating over the first pulleys 311 and the second pulleys 321 and has not been wound to the first driving wheel 330, can be cleaned before being wound to the first driving wheel. After the cleaning is finished, the second driving wheel 340 can be rotated. Since the other end of the integrated wire is fixed on the second driving wheel 340, the second driving wheel 340 drives the integrated wire to rotate over the first pulleys 311 and the second pulleys 321 and to move in the second direction. Thus, the wire wound to the first driving wheel 330 can be moved back into the frame 100 and reset between the first pulleys 311 and the second pulleys.

Further, in order to improve work operability, an operating handle can be provided to each of the first driving wheel 330 and the second driving wheel 340.

In an actual use, the driving subassembly is not limited to above-described configuration. As another example, the driving subassembly may be provided by a retractor that tows the integrated wire. The driving subassembly may be provided by other structures.

In the above-described configuration, the transmission structure uses the pulleys to arrange the wires so that multiple sections of the wires 200 included in each support layer are in the form of the integrated wire, and the pulleys drives the wire to move back and forth. In an actual use, the transmission structure is not limited to this configuration. As another example, the transmission structure may have the following configuration.

For example, two guide rod sets may be disposed on two opposed sides of the frame 100. Each guide rod set includes multiple guide rods array arranged in layers, and each guide rod array includes multiple guide rods. The integrated wire may be alternative wound to the multiple guide rods placed on the same layer in the two guide rod sets in order to configure the support layers. In this configuration, the integrated wire is able to perform the reciprocating motion around the multiple guide rods when driven by a driving subassembly. Alternatively, in order to ease the movement of the integrated wire, a sliding member can be provided to the guide rod. The transmission structure may also be formed in different way.

In the present embodiment, preferably, a lock device (not shown in the drawings) may be provided to the first driving wheel 330 and/or the second driving wheel 340 for controlling or limiting a movement of the integrated wire. With the first driving wheel 330 and/or the second driving wheel 340 to which the lock device is provided, an abnormal movement of the wire can be avoided.

In the present embodiment, preferably, as shown in FIG. 3 to FIG. 6, the multiple sections of the wires 200 included in one or more support layers are formed as a integrated wire and the multiple sections of the wires 200 included in each support layer are arranged in parallel between the first pulley set 310 and the second pulley set 320.

Figure 5:
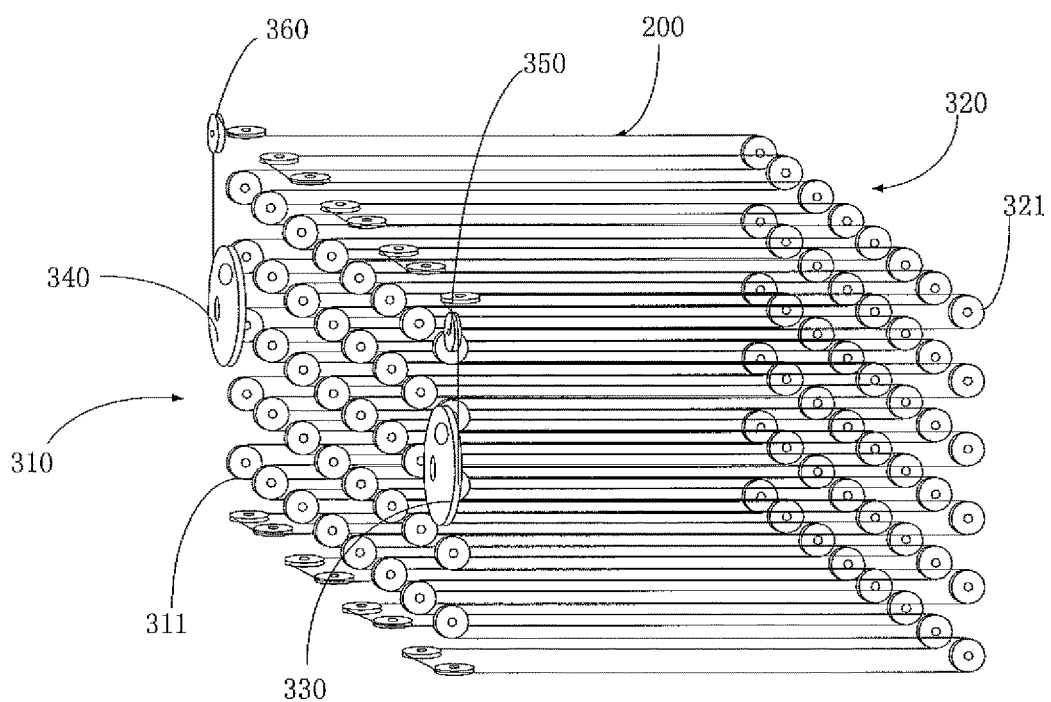
FIG. 5 is a diagram showing a connection between wires and a transmission structure included in the wire buffer device according to the present disclosure.
Figure 6:
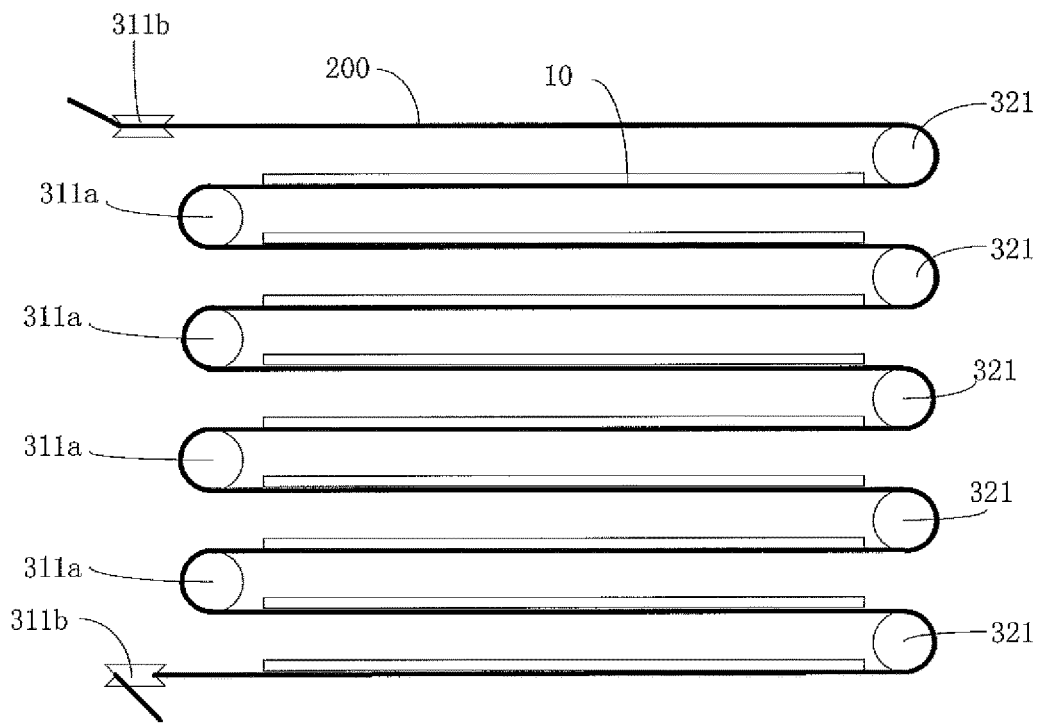
FIG. 6 is a diagram showing a connection between wires and a transmission structure included in the wire buffer device according to the present disclosure in a first direction.

At least a part of the multiple first pulleys 311 are provided by first parallel pulleys 311a. The first parallel pulleys 311a are arranged in the first direction which is parallel to a surface of the substrate 10 (that is, an axial direction of each first parallel pulley 311a is parallel to a plane on which the substrate 10 is placed). At least another part of the multiple first pulleys 311 are provided by first vertical pulleys 311b. The first vertical pulleys 311b are arranged in the second direction which is perpendicular to the surface of the substrate 10 (that is, the axial direction of each first vertical pulley 311b is perpendicular to the plane on which the substrate 10 is placed). Two first vertical pulleys 311b are respectively arranged outside both ends of each column of the first pulley set 310 for leading the integrated wire into the pulleys in said column and for leading the integrated wire out to the pulleys in the adjacent column. As shown in FIG. 5 and FIG. 6, the multiple second pulleys 321 may be arranged in the first direction as the second parallel pulleys.

In the present embodiment, the integrated wire is wound to the multiple first parallel pulleys 311a and the second pulleys 321, which are opposed to each other and arranged in the same lines in the first direction, so that the integrated wire is arranged on each line as the multiple sections of the wires 20 at predetermined intervals (as shown in FIG. 6). The integrated wire is arranged via two first vertical pulleys 311b that are arranged between two adjacent columns in the second direction. Thus, the integrated wire is able to be moved out from the pulleys on one column and be moved into another column adjacent to the one column. With multiple times of the winding, the integrated wire configures the multiple sections of the wires 200 that are arranged in multiple layers (as shown in FIG. 5 and FIG. 6). That is, in the present embodiment, a position at which the wire wound out one pulley is placed on the same horizontal level with a position at which the wire wound into a next pulley. Thus, the wire between two pulleys can function as a support wire of the support layer.

Figure 3:
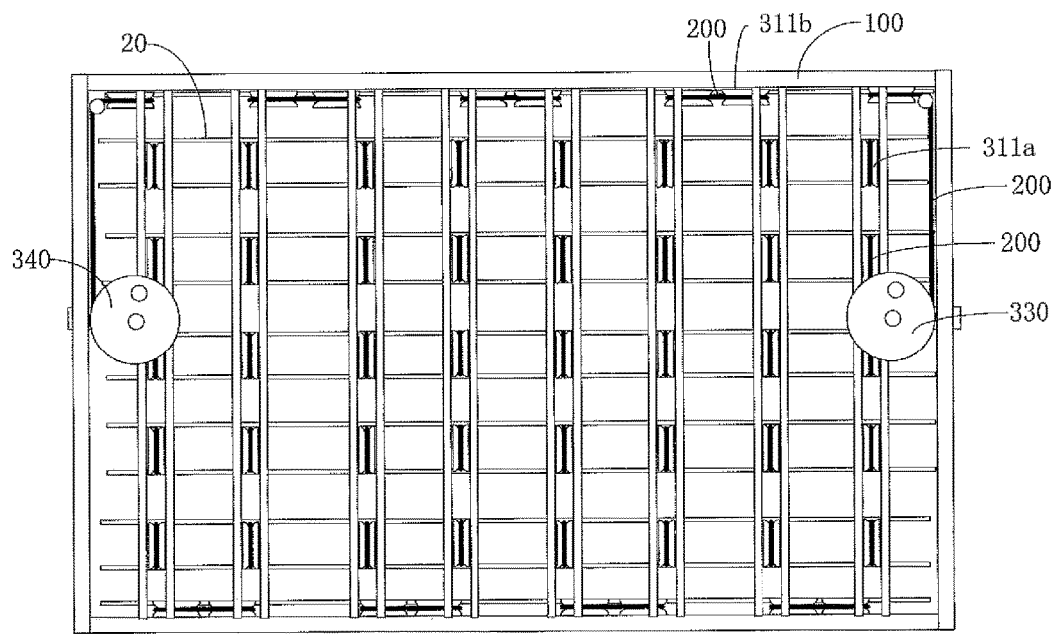
FIG. 3 is a left side view showing a configuration of the wire buffer device shown in FIG. 2.
Figure 4:
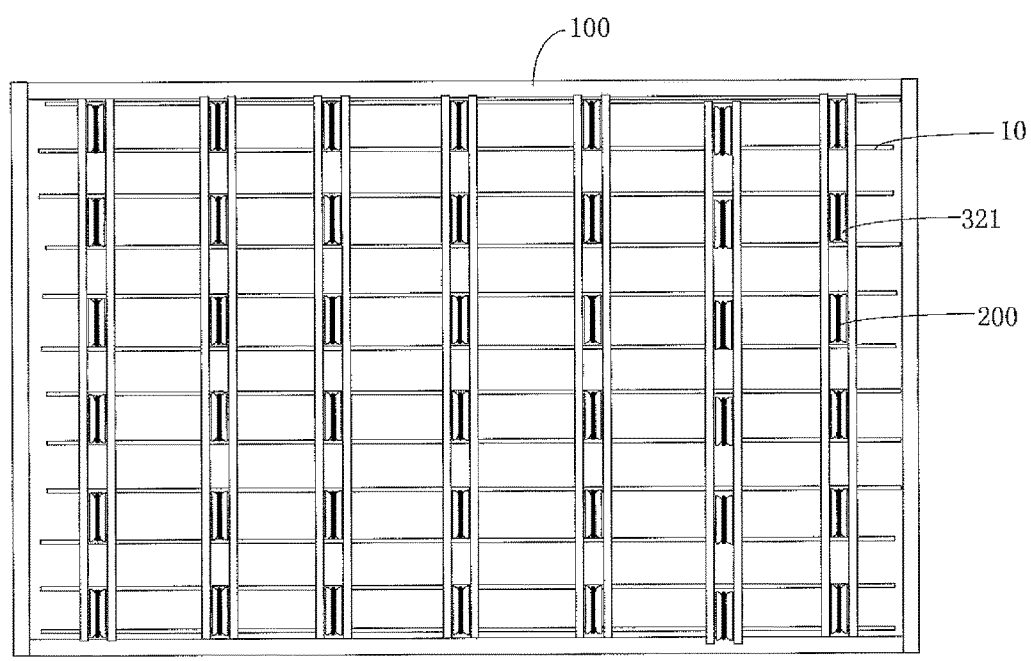
FIG. 4 is a right side view showing a configuration of the wire buffer device shown in FIG. 2.

In the above-described configuration, preferably, as shown in FIG. 3, multiple first vertical pulleys 311b can be provided. At outside position of two adjacent columns of the first parallel pulleys 311a, a pair of first vertical pulley 311b may be disposed in parallel. One of the first vertical pulley leads out the integrated wire wound on a first parallel pulley disposed at one end of one column, and the other first vertical pulley disposed in parallel leads the integrated wire into another first parallel pulley disposed at one end of another column. With this configuration, the integrated wire is moved from the first parallel pulley of one column to the first parallel pulley of adjacent column. Thus, the multiple layers of support layers are configured by reciprocating wounds as shown in FIG. 3, FIG. 5 and FIG. 6.

Preferably, a first guide wheel 350 may be disposed between the first driving wheel 330 and an initial pulley of the first pulley set 310 which leads the integrated wire into the frame 100, and a second guide wheel 360 may be disposed between the second driving wheel 340 and a last pulley of the first pulley set 310 which leads the integrated wire out from the frame 100. The first guide wheel 350 and the second guide wheel 360 helps to guide the integrated wire from pulley sets to the driving wheels.

The positions of the first guide wheel 350 and the second guide wheel are not limited to the example shown in FIG. 5. A person skilled in the art my properly place the first guide wheel 350 and the second guide wheel 360 based on positions of the pulley set and the driving wheel and an wounding mode of the integrated wire.

In the above-described configuration, a part of the first pulleys 311 are arranged in the first direction and another part of the first pulleys 311 are arranged in the second direction. Thus, the integrated wire can configure multiple sections of the wires 200 that are arranged in parallel in multiple layers. That is, the integrated wire can configure the multiple support layers and multiple sections of the wires 200 included in each support layer can be arranged in parallel.

In the above-described configuration, the integrated wire is arranged into multiple sections of the wires 200 in parallel in multiple layers by arranging a part of the first pulleys 311 in the first direction and arranging a part of the first pulleys 311 in the second direction in the first pulley set 310. In an actual use, the integrated wire may be arranged into the multiple sections of the wires 200 in parallel in multiple layers by other methods. For example, the first pulley set 310 and the second pulley set 320 can be switched by one another to configure the multiple support layers similar to above-described multiple support layers.

As another example, directions of the pulleys shown in FIG. 3 to FIG. 6 can be changed (not shown). For example, multiple lines of first vertical pulleys can be disposed in the first pulley set (that is, axes of multiple first vertical pulleys are perpendicular to the plane on which the substrate 10 is placed). Similarly, in the second pulley set, multiple lines of second vertical pulleys may be disposed with the corresponding levels of the multiple lines of first vertical pulleys. The integrated wire is wound from the first vertical pulley to the second vertical pulley in the same level, and then wound back to the next first vertical pulley. With this reciprocating winding of the integrated wire, one support layer may be configured. At outside of two lines of the first vertical pulleys, parallel pulleys can be disposed. Preferably, a pair of parallel pulleys can be disposed at outside of two lines of the first vertical pulleys. With this configuration, after wound to the parallel pulley, the integrated wire is able to be continually wound to the vertical pulleys corresponding to two sides of the next line and configure the next support layer. Two ends of the integrated wire are fixed to the two driving wheels, respectively, via respective guide wheels.

In the wire buffer device provided by the present embodiments, multiple support layers are provided. One or more support layers in the multiple support layers or a part of one or more support layers in the multiple support layers can be defined as one unit. Each unit may include one integrated wire wound to the first pulleys 311 and the second pulleys 321 in order to configure the support layers. That is, the integrated wire buffer device may include multiple integrated wires to configure the support layer. For example, when the wire buffer device has twenty support layers, each ten support layers may be defined as one unit. Each unit has an integrated wire, or all of the support layer may commonly use an integrated wire. At an external side of each unit, two driving wheels may be disposed.

As shown in FIG. 5 and FIG. 6, when the integrated wire is wound in unit of columns, each column or N columns may be defined as one unit. Each unit may have integrated wire wound to the first pulleys 311 and the second pulleys 321. At an outside of each unit, two driving wheels may be disposed.

Preferably, in the present embodiment, as shown in FIG. 5, the multiple sections of the wires included in each support layer is in the form of a integrated wire. That is, all of the support layers are configured by a same integrated wire by winding the integrated wire onto the pulleys. With this configuration, since the number of the integrated wire is equal to one, the number of the first driving wheel 330 that drives the integrated wire is equal to one, and also the number of the second driving wheel 340 that drives the integrated wire is also equal to one. Thus, a total weight of the wire buffer device can be reduced, and a dimension of the wire buffer device can be reduced.

In the actual use, an assembly method of the transmission structure is not limited to above-described embodiments. The transmission structure may be assembled in different ways.

In the present embodiment, preferably, a distance between two adjacent support layers may be equal to 4.5 cm, and a distance between two wire sections included in each support layer may be equal to 20 cm. In each support layer, the number of wire sections may be set based on the property of the production line. For example, when the substrate 10 has dimensions of 2200—2500 mm, the number of the wire sections included in each support layer may be set to eight.

More preferably, the wire may be provided by a plastic coated steel wire. Preferably, an internal steel wire of the plastic coated steel wire may be provided by a steel wire having a diameter of about 2 mm, and a plastic cover may have a thickness of 0.5 mm. In each support layer, each wire section may have a length of 2.3 m, and a total length of each integrated wire may be equal to or longer than 200 m. The material and dimension of the wire can be adjusted based on actual needs.

In the present embodiment, preferably, an internal diameter of each of the first pulley 311 and the second pulley 321 may be equal to 2 cm, and an external diameter of each of the first pulley 311 and the second pulley 321 may be equal to 2.7 cm. A width of an internal groove of each of the first pulley 311 and the second pulley 321 may be equal to 2.7 cm. A width of an internal groove of each of the first pulley 311 and the second pulley 321 may be equal to 3.5 mm. An internal diameter of each of the first driving wheel 330 and the second driving wheel 340 may be equal to 3 cm, and an external diameter of each of the first driving wheel 330 and the second driving wheel 340 may be equal to 50 cm. A width of an internal groove of each of the first driving wheel 330 and the second driving wheel 340 may be equal to 20 mm. The dimensions of the first pulley 311, the second pulley 321, the first driving wheel 330, and the second driving wheel 340 can be adjusted based on actual needs.

Preferably, a total number of the first pulleys 311 and the second pulleys 321 corresponding to each support layer may be equal to 16, the number of the first pulleys 311 corresponding to each support layer may be equal to 8, and the number of the second pulleys 321 corresponding to each support layer may be equal to 8. The number of the first pulleys 311 and the second pulleys 321 can be adjusted based on actual needs.

In order to clean the wire more clearly, a length of the integrated wire may be set equal to or greater than twice of the sum of length of the wires that are currently being used and being wound to the multiple pulleys.

It should be noted that the present disclosure is not limited the above preferred embodiments and modifications thereof. That is, the above embodiments and modifications thereof may be modified by a person skilled in the art in various ways without departing from the sprit and scope of the present disclosure.

What is claimed is:

1. A wire buffer device, comprising:
   a frame; and
   a multiple of support layers provided to the frame and arranged in layers, each of the support layers including multiple sections of wires that support a substrate, wherein,
   the multiple sections of wires are in the form of at least one integrated wire,
   the wire buffer device further includes at least one transmission structure, said at least one transmission structure drives each of said at least one integrated wire to perform a reciprocating motion so that at least a part of each of said at least one integrated wire moves into or moves out from the frame.

2. The wire buffer device according to claim 1, wherein the transmission structure drives the multiple sections of wires included in each of said at least one integrated wire to move into or move out from the frame.

3. The wire buffer device according to claim 1, wherein the transmission structure drives the multiple sections of wires included in each of said at least one integrated wire to entirely move into or move out from the frame.

4. The wire buffer device according to claim 1, wherein the transmission structure includes:
   a first pulley set and a second pulley set respectively fixed to two opposed sides of the frame, the first pulley set including a multiple of first pulleys arranged in an approximate rectangular array and the second pulley set including a multiple of second pulleys arranged in an approximate rectangular array; and a driving subassembly that drives the integrated wire to be transmitted in the transmission structure, the integrated wire alternately wounds to the first pulleys and the second pulleys in turn to form the support layers.

5. The wire buffer device according to claim 4, wherein the driving subassembly includes:

a first driving wheel that drives the integrated wire to rotate over the first pulleys and the second pulleys in a first direction, one end of the integrated wire being fixed to the first driving wheel; and a second driving wheel that drives the integrated wire to rotate over the first pulleys and the second pulleys in a second direction opposite to the first direction, the other end of the integrated wire being fixed to the second driving wheel.

6. The wire buffer device according to claim 5, wherein at least one of the first driving wheel and the second driving wheel includes a lock device that controls movement of the integrated wire.

7. The wire buffer device according to claim 4, wherein, in at least two of the support layers, the multiple sections of wires are in the form of an integrated wire, and the multiple sections of wires included in each support layer are arranged in parallel between the first pulley set and the second pulley set.

8. The wire buffer device according to claim 4, wherein, at least one part of the first pulleys are arranged as multiple columns of first parallel pulleys, wherein, rotating axes of the first parallel pulleys are in a first direction that is parallel to a direction in which the substrate is placed; another part of the first pulleys are arranged as first vertical pulleys, wherein, rotating axes of the first vertical pulleys are in a second direction that is perpendicular to the direction in which the substrate is placed, and the second pulleys are arranged as multiple columns, wherein, rotating axes of the second pulleys are in the first direction that is parallel to the direction in which the substrate is placed, the integrated wire are wound back and forth on the first parallel pulleys and the second pulleys that are included in corresponding columns and are arranged in the first direction, so that the integrated wire forms the multiple sections of wires arranged at predetermined intervals in vertical direction in different support layers, and the first vertical pulleys are arranged outside of two ends of each column of the first parallel pulleys and are used to lead the integrated wire from the first parallel pulley included in one column to the first parallel pulley included in an adjacent column.

9. The wire buffer device according to claim 4, wherein one part of the first pulleys are arranged as second parallel pulleys, wherein, rotating axes of the second parallel pulleys are in a first direction that is parallel to a direction in which the substrate is placed; the other part of the first pulleys are arranged as multiple lines of second vertical pulleys, wherein, rotating axes of the second vertical pulleys are in a second direction that is perpendicular to the direction in which the substrate is placed, and the second pulleys are arranged as multiple lines, wherein, rotating axes of the second pulleys are in the second direction that is perpendicular to the direction in which the substrate is placed, the integrated wire are wound back and forth on the second vertical pulleys and the second pulleys that are included in corresponding lines and are arranged in the second direction, so that the integrated wire forms the multiple sections of wires arranged at predetermined intervals in horizontal direction in each of the support layers, and the second parallel pulleys are arranged outside of two ends of each line of the second vertical pulleys and are used to lead the integrated wire from the second vertical pulley included in one line to the second vertical pulley included in an adjacent line.

10. The wire buffer device according to claim 8, wherein the multiple sections of wires included in all of the support layers are in the form of one integrated wire.

11. The wire buffer device according to claim 9, wherein the multiple sections of wires included in all of the support layers are in the form of one integrated wire.

12. The wire buffer device according to claim 8, wherein a position at which the integrated wire is leaded out from a first parallel pulley is aligned with and placed on a same horizontal level with a position at which the integrated wire is leaded into a next second pulley; or a position at which the integrated wire is leaded out from a second pulley is aligned with and placed on a same horizontal level with a position at which the integrated wire is leaded into a next first parallel pulley.

13. The wire buffer device according to claim 9, wherein the integrated wire forms each horizontal support layer by being wound back and forth to the second vertical pulleys and the second pulleys that are arranged in a same line and on a same horizontal level in the second direction.

14. The wire buffer device according to claim 8, wherein at a position outside of two adjacent columns of first parallel pulleys, a pair of first vertical pulleys parallel to one another is arranged in order to guide the integrated wire from one first parallel pulley included on one column to the first parallel pulley included on an adjacent column.

15. The wire buffer device according to claim 9, wherein at a position outside of two adjacent lines of second vertical pulleys, a pair of first parallel pulleys parallel to one another is arranged in order to guide the integrated wire from one second vertical pulley included in one line to the second vertical pulley included in an adjacent line.

16. The wire buffer device according to claim 5, wherein the driving subassembly further includes:

a first guide wheel disposed between the first driving wheel and one of the pulleys which guides the integrated wire firstly into the frame; and a second guide wheel disposed between the second driving wheel and one of the pulleys which guides the integrated wire lastly from the frame.

17. The wire buffer device according to claim 1, wherein a distance between two of the support layers adjacent to each other is equal to 4.5 cm, and a distance between two adjacent wires in each of the support layers is equal to 20 cm.

18. The wire buffer device according to claim 1, wherein the wires are provided by plastic coated steel wires.

19. The wire buffer device according to claim 4, wherein,
  in each of the first pulleys and the second pulleys, an internal diameter is equal to 2 cm, an external diameter is equal to 2.7 cm, and a width of an internal groove is equal to 3.5 mm, and
  in each of the first driving wheel and the second driving wheel, an internal diameter is equal to 3 cm, an external diameter is equal to 50 cm, and a width of an internal groove is equal to 20 mm.

20. The wire buffer device according to claim 4, wherein a length of each of the at least one integrated wire is equal to or greater than twice the sum length of the wires that are currently being used as support layers by being wound to the pulleys.

* * * * *